No. 613,399. Patented Nov. 1, 1898.
A. W. SOUTHEY.
STEERING WHEEL FOR MOTOR VEHICLES.
(Application filed Aug. 6, 1898.)
(No Model.)
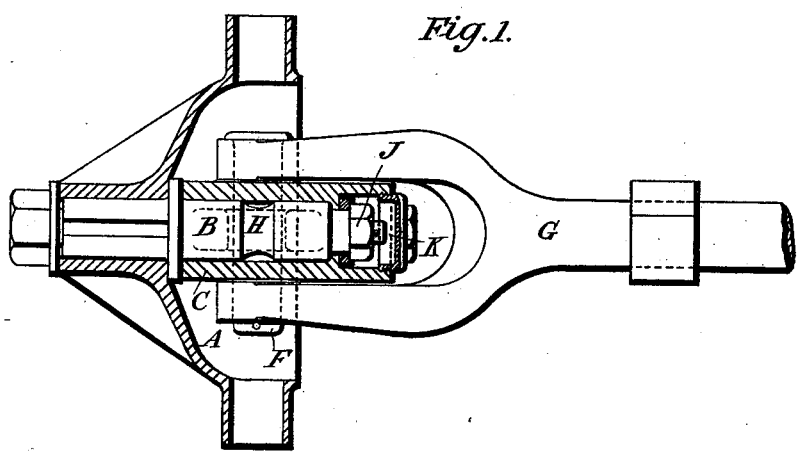
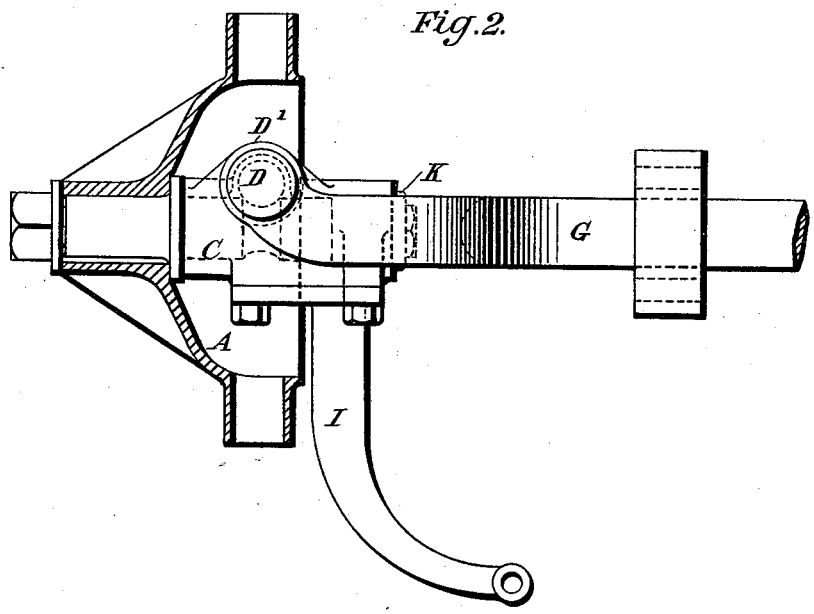
WITNESSES:
Fred White
Charles K. Fraser
INVENTOR:
Alfred William Southey,
By his Attorneys:
Arthur E. Fraser & Co.
THE NORRIS PETERS CO., PHOTO-LITHO., WASHINGTON, D. C.

UNITED STATES PATENT OFFICE.

ALFRED W. SOUTHEY, OF LONDON, ENGLAND.

STEERING-WHEEL FOR MOTOR-VEHICLES.

SPECIFICATION forming part of Letters Patent No. 613,399, dated November 1, 1898.

Application filed August 6, 1898. Serial No. 687,886. (No model.)

*To all whom it may concern:*

Be it known that I, ALFRED W. SOUTHEY, of 16 Elm street, Gray's Inn road, London, England, have invented certain new and useful Improvements in Steering-Wheels for Mechanically-Propelled Road-Vehicles, of which the following is a specification.

This invention relates to separately-pivoted steering-wheels for mechanically-propelled road-vehicles, and particularly to that kind in which the wheel has its pivoting-point situated in the plane of the center of the wheel-tire.

It has for its object to simplify the construction of such wheels and, if desired, to give them a tendency to run straight ahead.

According to my invention the steering-wheels have hollow hubs, preferably of metal, and each carries an internally-projecting trunnion, keyed or otherwise rigidly attached thereto, such trunnion constituting the internal member of the wheel-bearing. The external member consists of a metal sleeve within which the trunnion rotates with or without the interposition of balls, rollers, or other antifriction device. The external member is also provided with a hole, bored vertically through it at one side of the horizontal bearing, within which the trunnion rotates and is caused to pivot for the purposes of steering by being mounted on a vertical pin supported in a solid metal fork formed on the end of the fixed axle and passing through the vertical hole in the external member. The said external member is preferably formed with an extension at the side, through which the vertical hole is bored, the position of the extension being such that the axis of the vertical hole through it is in the plane of the center of the wheel-tire. The relative positions of the horizontal and vertical borings in the external member or sleeve may be varied within certain limits. For example, the vertical boring may be so much to the side of the horizontal as to be separated from it by a certain portion of metal, or the two borings may just touch, or the vertical may cut the horizontal hole to any desirable extent, in which case the trunnion has an annular groove to allow of the passage of the vertical pin, or, if desired, a plain trunnion may be used and a groove be formed on the vertical pin. In the former case the pin also acts as a locking device to hold the trunnion in the sleeve and resist lateral strains.

In carrying my invention into effect the vertical pivot is preferably placed in advance of the horizontal trunnion, thus giving to the steering-wheels a slight caster action or tendency to run straight, the amount of which will depend upon the horizontal distance between the axes of the horizontal and vertical bearings, respectively. The external member carries also a steering-arm, rigidly attached to it in any desirable way.

In the accompanying drawings, Figure 1 is a vertical mid-section, and Fig. 2 a plan, with the hollow hub in section, of so much of a steering-wheel as is necessary to illustrate my invention.

A is the hollow hub to which the spokes (not shown) of the wheel are attached.

B is the internally-projecting trunnion, rigidly fixed to the hub A.

C is the metal sleeve within which the trunnion B rotates, the bearing in the case shown being without antifriction device, though such may be added, if required.

D' is an extension formed on the external member C at one side of the horizontal bearing, within which the trunnion B rotates.

D is the hole bored vertically through the extension D'.

F is the vertical pin passed through the vertical hole D and on which the external member pivots for the purposes of steering.

G is the solid metal fork forming part of the fixed axle of the vehicle and supporting the vertical pin F.

H is an annular groove in the horizontal trunnion B to allow of the passage of the vertical pin F where the vertical cuts into the horizontal hole, as is the case in the particular construction shown in the drawings.

I is the steering-arm, rigidly attached to the external member C and connected in any desirable way to the steering-handle of the carriage.

J K are respectively the usual lock-nuts and dust-caps by which the trunnion is held in place and lubricated, respectively.

It is evident that, in the construction illustrated, where the vertical pin cuts into the trunnion the hub must be removed from the said trunnion before the pin can be drawn and the trunnion slipped from its bearing, owing to the length of the vertical pin in relation to the internal diameter of the hub.

What I claim, and desire to secure by Letters Patent, is—

1. In separately-pivoted steering-wheels for mechanically-propelled road-vehicles, the combination with a hollow hub carrying an inwardly-projecting trunnion and a sleeve within which such trunnion rotates, of a vertical pin or pivot passing through the said sleeve (or through an extension thereof) at one side of the said trunnion, and a fixed fork supporting said pin substantially as and for the purposes described.

2. In separately-pivoted steering-wheels for mechanically-propelled road-vehicles, the combination with a hollow hub carrying an inwardly-projecting trunnion and a sleeve within which such trunnion rotates, of a vertical pin or pivot passing through the said sleeve (or through an extension thereof) at the side and in advance of the said trunnion, and a fixed fork supporting said pin, whereby a caster action is obtained, substantially as and for the purposes described.

3. In separately-pivoted steering-wheels for mechanically-propelled road-vehicles, the combination of a hollow hub carrying an inwardly-projecting trunnion and a sleeve within which such trunnion rotates, of a vertical pin or pivot passing through the said sleeve (or through an extension thereof) at one side of the said trunnion and an annular groove in the said trunnion allowing of the passage of said vertical pin, whereby a locking action is obtained, substantially as and for the purposes described.

4. In separately-pivoted steering-wheels for mechanically-propelled road-vehicles, the combination with a hollow hub having an inwardly-projecting trunnion, a sleeve within which such trunnion rotates, and a fixed fork supporting said sleeve, of a pivotal connection between said fork and sleeve having a vertical axis at one side of the axis of said trunnion, substantially as and for the purposes described.

5. In separately-pivoted steering-wheels for mechanically-propelled road-vehicles, the combination with a hollow hub having an inwardly-projecting trunnion, a sleeve within which such trunnion rotates, and a fixed fork supporting said sleeve, of a pivotal connection between said fork and sleeve having a vertical axis at one side of, and in advance of, the axis of said trunnion, whereby a caster action is obtained, substantially as and for the purposes described.

6. In separately-pivoted steering-wheels for mechanically-propelled road-vehicles, the combination with a hollow hub, of an inwardly-projecting trunnion carried thereby and having an annular groove, a sleeve within which such trunnion rotates, and a vertical pin passing the said sleeve at one side of the said trunnion and entering said annular groove in the said trunnion, whereby a locking position is obtained, substantially as and for the purposes described.

In witness whereof I have hereunto signed my name in the presence of two subscribing witnesses.

ALFRED W. SOUTHEY.

Witnesses:
JOHN C. MEWBROW,
ROBERT M. SPEARPOINT.